United States Patent
Hohmann et al.

(10) Patent No.: US 10,239,194 B2
(45) Date of Patent: Mar. 26, 2019

(54) TENSIONING DEVICE FOR EXTENDING A THREADED BOLT

(71) Applicants: Frank Hohmann, Warstein (DE); Jörg Hohmann, Meschede (DE)

(72) Inventors: Frank Hohmann, Warstein (DE); Jörg Hohmann, Meschede (DE)

( * ) Notice: Subject to any disclaimer, the term of this patent is extended or adjusted under 35 U.S.C. 154(b) by 370 days.

(21) Appl. No.: 15/074,099

(22) Filed: Mar. 18, 2016

(65) Prior Publication Data

US 2016/0271775 A1 Sep. 22, 2016

(30) Foreign Application Priority Data

Mar. 19, 2015 (DE) .................. 10 2015 104 133

(51) Int. Cl.
*B25B 29/02* (2006.01)
*B23P 19/06* (2006.01)
*F16B 31/04* (2006.01)

(52) U.S. Cl.
CPC ............ *B25B 29/02* (2013.01); *B23P 19/067* (2013.01); *F16B 31/043* (2013.01)

(58) Field of Classification Search
CPC ....... B25B 29/02; B23P 19/067; F16B 31/043
USPC ........................................................ 81/57.38
See application file for complete search history.

(56) References Cited

U.S. PATENT DOCUMENTS

| | | | | |
|---|---|---|---|---|
| 5,699,703 | A * | 12/1997 | Habele | B25B 23/14 254/29 A |
| 8,375,554 | B2 | 2/2013 | Wagner et al. | |
| 8,616,094 | B2 | 12/2013 | Hohmann et al. | |
| 9,744,656 | B2 * | 8/2017 | Hohmann | B23P 19/067 |
| 9,981,369 | B2 * | 5/2018 | Hohmann | B25B 29/02 |
| 2011/0188960 | A1 * | 8/2011 | Hohmann | B23P 19/067 411/14.5 |
| 2011/0271798 | A1 | 11/2011 | Wagner et al. | |
| 2013/0008015 | A1 * | 1/2013 | Junkers | B23P 19/067 29/525.02 |
| 2014/0000414 | A1 * | 1/2014 | Hohmann | B25B 29/02 81/57.38 |
| 2014/0165789 | A1 * | 6/2014 | Hohmann | B25B 29/02 81/57.38 |

FOREIGN PATENT DOCUMENTS

| | | |
|---|---|---|
| DE | 2 130 507 | 12/1972 |
| DE | 23 28 444 | 1/1975 |

* cited by examiner

*Primary Examiner* — David B. Thomas
(74) *Attorney, Agent, or Firm* — Gudrun E. Huckett

(57) ABSTRACT

A tensioning device for a thread end portion of a bolt has a cylindrical housing and a piston, moveable in longitudinal direction therein and connectable to a hydraulic supply. An interchangeable sleeve extends centrally through the piston. At its end it has an internal thread with engagement length to be screwed onto the thread end portion. The sleeve has a radially expanded portion carried axially by a carrier face of the piston. In order to prevent the sleeve from prematurely contacting the threaded bolt when mounting the bolt tensioning cylinder and prevent damage to the threads, the sleeve is moveable longitudinally relative to the piston. The longitudinal sleeve travel is defined by the carrier face as first longitudinal stop and by a second longitudinal stop. The longitudinal sleeve travel is at least equal to, preferably greater, than the engagement length of the internal thread of the sleeve.

15 Claims, 1 Drawing Sheet

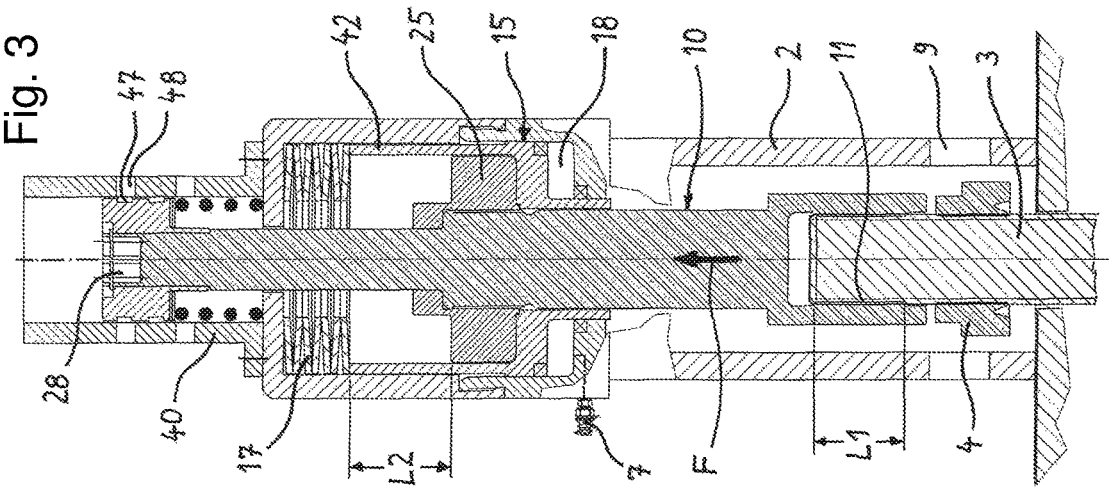
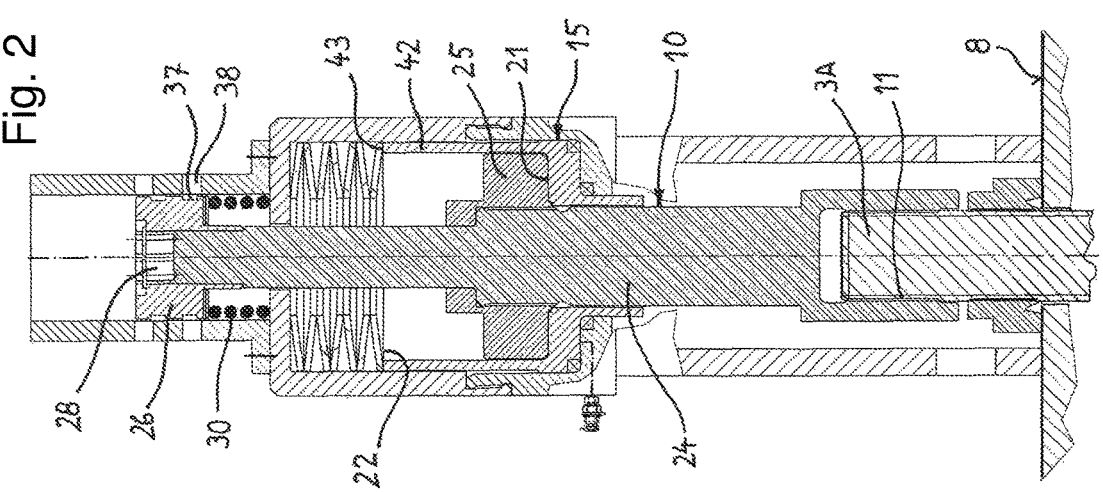
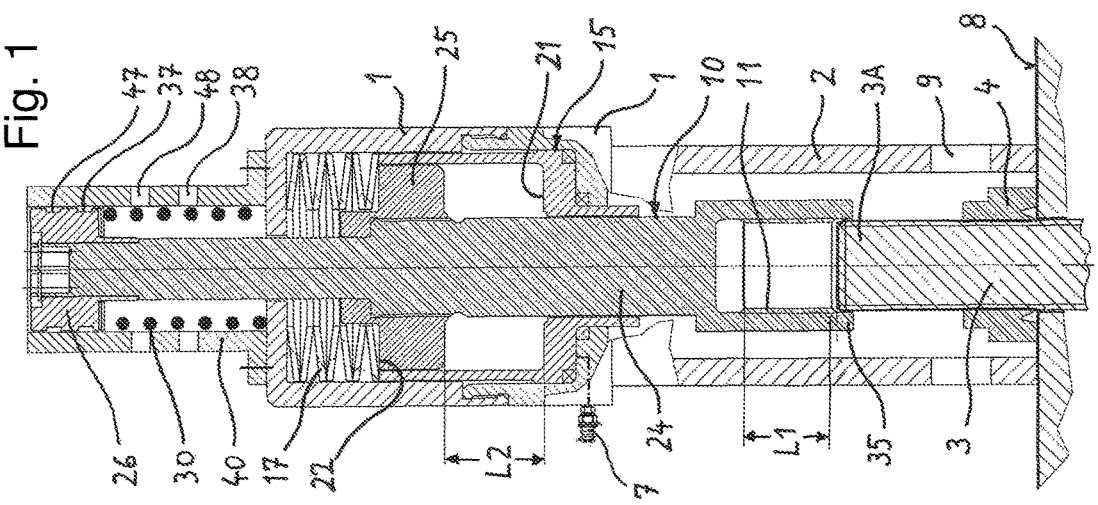

TENSIONING DEVICE FOR EXTENDING A THREADED BOLT

BACKGROUND OF THE INVENTION

The invention relates to a tensioning device for tensile stressing (extending) a threaded bolt on its thread end portion, having a cylindrical housing which is supported against a fixed abutting base and has at least one piston, moveable in a longitudinal direction therein and connectable to a hydraulic supply, and having an interchangeable sleeve, which leads centrally through the piston, at its end having an internal thread with an engagement length that can be screwed onto the thread end portion, the sleeve being provided with a radially expanded portion designed to be carried axially by a carrier face formed on the piston.

U.S. Pat. No. 8,375,554 B2 discloses a hydraulically functioning bolt tensioning device having these features. For stressing the threaded bolt an interchangeable sleeve, which is provided at its lower end with an internal thread for screwing to the threaded bolt, is arranged in the cylindrical housing of the tensioning device. The interchangeable sleeve can be carried axially by a hydraulically actuated piston of the tensioning device, and for this purpose is provided with a radially expanded flange or collar.

Bolt tensioning devices having multiple interchangeable sleeves are also disclosed by U.S. Pat. No. 8,616,094 B2, for example. Here the inner interchangeable sleeve is displaceable in an axial direction relative to the outer interchangeable sleeve and is pre-sprung against the outer interchangeable sleeve. After screwing on the interchangeable sleeves the bolt is axially tensioned by two hydraulically operated pistons, which move the outer and the inner interchangeable sleeves simultaneously in an axial direction. The total pre-tensioning force is transmitted to two separate threads of the bolt by a thread of the inner interchangeable sleeve and thread of the outer interchangeable sleeve.

In the case of a bolt tensioning device disclosed by US 2011/0271798 A1 also, the threaded bolt is axially stressed by means of an interchangeable sleeve engaging in the thread of the threaded bolt. This sleeve can be carried axially by pistons of the tensioning device arranged in series, in that the interchangeable sleeve is provided close to its upper end with a thread, onto which a flange or collar, undercut by the uppermost piston, is screwed. A spring arrangement arranged around the interchangeable sleeve is supported against the collar and in addition against the interchangeable sleeve so that the latter always bears against the uppermost piston. In order to screw the interchangeable sleeve onto the threaded bolt, the tensioning device is mounted onto the threaded bolt from above and rotated about its axis so that the interchangeable sleeve is screwed onto the free threaded portion of the threaded bolt.

Screwing the tensioning device on in this way and rotating it about its axis is time-consuming and in view of the weight of such bolt tensioning devices also laborious. Moreover, mounting the heavy tensioning device leads to a sometimes hard, uncontrolled collision between the threaded portion of the interchangeable sleeve and the threaded bolt, which may cause damage to the threads involved.

It is the object of the invention, through design measures on the tensioning device, to avoid the interchangeable sleeve coming into premature contact with the threaded bolt whilst mounting the bolt tensioning cylinder, and in this way to prevent damage to the threads involved.

SUMMARY OF THE INVENTION

For this purpose, a tensioning device of the aforementioned kind is characterized in that the interchangeable sleeve is moveable longitudinally in relation to the piston, the longitudinal travel of the interchangeable sleeve being delimited by the carrier face as a first longitudinal stop and by a second longitudinal stop opposite the first longitudinal stop, and a length of the longitudinal travel being at least equal to, and preferably greater than, the engagement length of the internal thread of the interchangeable sleeve.

With a tensioning device configured in this way, premature contact between the thread on the interchangeable sleeve and the thread on the threaded bolt cannot occur when mounting the tensioning device so that unwanted damage to the threads involved is avoided in this fitting situation.

According to one embodiment of the tensioning device, the interchangeable sleeve is supported under the force of a spring against the second longitudinal stop. The spring causes the interchangeable sleeve to automatically assume a basic position inside the bolt tensioning device in which it is retracted so far upwards that, when mounting the bolt tensioning cylinder onto the threaded bolt, no contact yet occurs between the interchangeable sleeve and the thread end of the threaded bolt. Only against the force of the spring is it possible to move the interchangeable sleeve towards the threaded bolt; only then the interchangeable sleeve can be screwed onto the thread end portion of the threaded bolt through engagement of the threads involved.

According to a further embodiment, the spring holding back the interchangeable sleeve is a coil spring, which encloses a longitudinal portion of the interchangeable sleeve and is supported by its first end against the interchangeable sleeve. The spring is preferably supported by its second end against a face on the cylindrical housing. In addition, the first end of the spring is preferably supported against a collar, with which the interchangeable sleeve is provided at its end remote from the internal thread. This collar may be formed on an end piece, which is fixed to the interchangeable sleeve preferably by a screw connection.

According to a further embodiment, the piston of the tensioning device, for receiving the radially expanded portion of the interchangeable sleeve, is provided with a cavity of a length such that the expanded longitudinal portion is moveable therein over the longitudinal travel of the interchangeable sleeve. In this case the cavity is enclosed by a wall of the piston which comprises an upper end face, a spring being supported against this end face with one end and against the cylindrical housing with the other end. The outside surface of the wall is preferably cylindrical and forms together with the inside wall of the cylindrical housing a longitudinal guide of the piston.

A further embodiment is characterized by a socket which is fixed to the cylindrical housing and which encloses an end portion of the interchangeable sleeve remote from the internal thread, the end portion and the socket each being provided with markings to be aligned or matched with each other. The marking on the interchangeable sleeve is preferably a visual marking, for example a color marking or a contrast marking, and the marking on the socket is preferably a sighting window in the socket. In this embodiment, the visual marking is visible from the exterior in the sighting window only when the interchangeable sleeve bears on the carrier face, and the tensioning can therefore commence.

BRIEF DESCRIPTION OF THE DRAWINGS

Further details and advantages emerge from the following description of an exemplary embodiment represented in the drawing, in which:

FIG. 1 shows a simplified, sectional representation of a hydraulically functioning threaded bolt-tensioning device, applied in alignment with a threaded bolt and supported on a base.

FIG. 2 shows the same threaded bolt-tensioning device in the further course of a fitting situation.

FIG. 3 shows the same threaded bolt-tensioning device during the tensioning process.

DESCRIPTION OF PREFERRED EMBODIMENTS

The hydraulically operated tensioning device described here serves for tightening, primarily retightening, and possibly also slackening highly stressed bolted connections. The tensioning device is used to apply a predefined pre-tensioning force F (FIG. 3) to a threaded bolt 3 in the longitudinal direction of the bolt for a certain length of time in order to meanwhile tighten or retighten a nut 4 of the bolted connection screwed onto the threaded bolt 3.

An interchangeable sleeve 10 arranged centrally in the tensioning device is provided at its one end with a sleeve portion having an internal thread 11. Before commencing the tensioning process, the internal thread 11 is screwed onto a thread end portion 3A of the threaded bolt 3 projecting beyond the nut 4. Then the interchangeable sleeve 10 thus screwed onto the threaded bolt 3 is hydraulically tensioned by applying the force F, thereby stressing and axially tightening the threaded bolt 3 in the longitudinal direction. The underside of the nut 4 thereby lifts off so that the nut 4 can be turned with virtually no resistance and tightened in this way.

The hydraulic tensioning mechanism is enclosed by a pressure-resistant cylindrical housing 1. This may be of a modular assembly comprising a plurality of cylindrical portions. The rigid, downward continuation of the cylindrical housing 1 forms a support tube 2 enclosing the nut. The support tube 2 may be integrally formed with the cylindrical housing 1, or alternatively it may be a separate component from the cylindrical housing 1, for example one that can be attached thereto. The support tube 2 is open on its underside and is supported on a fixed base 8, which serves as abutment in the tensioning process. In the exemplary embodiment described herein, the base 8 is the machine part on which the nut 4 is also supported by its underside. In addition, there may also be a mechanism, which serves for turning the nut 4, functioning through an opening 9 in the support tube 2. This turning is naturally possible only when the tensioning device is working, that is to say stressing or extending the bolt, and the nut 4 is therefore not subject to considerable friction.

On the side of the cylindrical housing 1 is a hydraulic connection 7, via which the hydraulic working chamber of the tensioning device has a valve-controlled connection to an external hydraulic supply.

The cylindrical housing 1 comprises one or alternatively more hydraulic cylinders, which are connected to the external hydraulic supply via the hydraulic connection 7 and a flexible, pressure-resistant hydraulic line. A longitudinally moveable piston 15 is arranged in each hydraulic cylinder, sealed off towards the inside wall of the cylinder. In the exemplary embodiment described herein, there is only one cylinder stage and therefore also only one piston 15.

The piston 15 is raised by feeding hydraulic pressure into the hydraulic working chamber 18 of the cylinder. This occurs in opposition to the pressure from a strong spring 17 acting on the piston 15 from above. The spring 17 here comprises annular disk springs stacked one on top of another and therefore connected in series. The spring 17 serves as piston return spring and acts directly on the piston 15 with a force which strives to keep the piston 15 in the basic position reproduced in FIG. 1 and in FIG. 2, in which the hydraulic working chamber 18 is smallest.

The piston 15 annularly surrounds the interchangeable sleeve 10. It is provided on its inside edge with a circumferential step, which remote from the base 8 forms a carrier face 21, on which the interchangeable sleeve 10 is supported by way of a radially expanded portion 25 affixed thereto. In this way the interchangeable sleeve 10 can be axially carried by the piston 15.

The interchangeable sleeve is of three-part construction and is composed of a narrow main body 24, a flange forming the radially expanded portion 25, and an end piece 26.

The main body 24 of the interchangeable sleeve is situated centrally on the longitudinal axis of the tensioning device, and is provided at its bolt-side end with the internal thread 11 for screwing onto the threaded bolt 3. The flange forming the radially expanded portion 25 is screwed onto the main body 24, inasmuch producing a rigid unit. The end piece 26 is situated at the other end of the interchangeable sleeve 10, that is to say the end remote from the thread 11. The end piece 26 is also screwed to the main body 24 and therefore forms a rigid unit with the latter.

At its upper end the interchangeable sleeve 10 is provided with a polyhedron 28, to which a standard commercial tool can be applied in order firstly to turn the interchangeable sleeve 10 in relation to the cylindrical housing 1 and secondly in order to move the interchangeable sleeve 10 in a longitudinal direction towards the threaded bolt 3. In the exemplary embodiment described herein, this movement is performed in opposition to the force of a spring 30, which is supported by its first end against the interchangeable sleeve 10, and by its second end against the cylindrical housing 1. The spring 30 ensures that the interchangeable sleeve 10 normally assumes a position in which it is supported on the second longitudinal stop 22.

The function of the second longitudinal stop 22 here is assumed by the underside of the strong spring 17, which acts upon the piston 15. This spring 17 is significantly stronger or stiffer than the spring 30 bearing against the interchangeable sleeve.

The spring 30 takes the form of a coil spring, which encloses a narrow longitudinal portion of the interchangeable sleeve 10. The spring 30 is supported on the interchangeable sleeve, not directly on the main body 24 of the interchangeable sleeve but on the end piece 26 forming a collar of the interchangeable sleeve.

The piston 15 is provided with a wall 42, which encloses a cavity and extends in a longitudinal direction up to an end face 43, against which the spring 17 is supported by its lower end. With its other end the spring 17 is supported from inside against a face of the cylindrical housing 1. The outside of the wall 42 is cylindrical and together with the inside wall of the cylindrical housing 1 forms a part of the longitudinal guide of the piston 15.

In order to avoid a hard impact of the thread 11 of the interchangeable sleeve 10 on the external threads of the threaded bolt 3 when mounting the bolt tensioning cylinder onto the threaded connection, as is reproduced in FIG. 1, and thus prevent damage to the threads, the maximum longitudinal travel L2 over which the portion 25 of the interchangeable sleeve is able to move in a longitudinal direction between its bearing contact against the first longitudinal stop 21 and its bearing contact against the longitudinal stop 22 is at least equal to the engagement length L1 of the internal thread 11, and preferably somewhat greater than this engagement length. The term engagement length L1 here denotes that length over which the thread 11 is in engagement with the threaded bolt 3 when the interchangeable sleeve 10 is fully screwed onto the thread end portion 3A.

Arranging the interchangeable sleeve 10 so that it is longitudinally moveable relative to the piston 15 allows the interchangeable sleeve 10 to assume a basic position inside the tensioning device in which it does not bear on the piston 15, but rather with its portion 25 bears against the second longitudinal stop 22. This ensures that during mounting of the tensioning device no contact can yet occur between the thread 11 of the interchangeable sleeve and the threads of the thread end portion 3A so that in this fitting situation, reproduced in FIG. 1, the possibility of damage is excluded. Rather than extending to the outermost end of the interchangeable sleeve 10, there is nothing to prevent the internal thread 11 there actually being replaced by a short, threadless collar 35, which in the situation according to FIG. 1 overlaps the threaded bolt 3 somewhat in a longitudinal direction. The collar 35 serves for simplified initial centering of the tensioning device on the threaded bolt 3. Since it lacks a threaded structure, however, it is not likely to damage the external thread of the threaded bolt 3.

Once the tensioning device is settled on the base 8 in alignment with the threaded bolt 3 according to FIG. 1, in the next step, which is reproduced in FIG. 2, the interchangeable sleeve 10 is screwed onto the thread end portion 3A. For this purpose, an appropriate tool, for example a bolt tool, is applied to the flat face 28 and used to move the interchangeable sleeve 10 initially towards the threaded bolt 3 until the internal thread 11 engages in the external thread of the bolt 3. Further turning of the tool then leads to a screwing action, in which the portion 25 of the interchangeable sleeve 10 inside the cavity of the piston 15 covers the longitudinal travel L2, until finally the portion 25 encounters the first longitudinal stop 21. In this situation, which is reproduced in FIG. 2, the internal thread 11 engages over its full engagement length L1 in the external thread of the bolt 3.

In this situation according to FIG. 2 a marking 37 located on the end piece 26 is precisely on a level with a sighting window 38, which is situated in a socket 40. The socket 40 is fixed to the cylindrical housing 1 and encloses the end portion of the interchangeable sleeve 10 remote from the internal thread 11. The marking 37 present on sides of the interchangeable sleeve is here a colour or contrast marking arranged in a circumferential groove of the end piece 26. The groove itself is also suitable as a marking 37, provided that it is sufficiently discernible through the sighting window 38 of the socket 40 forming the countermark. If, in accordance with FIG. 2, the two markings 37, 38 lie one behind another on the same level, this indicates to the operator of the appliance that the interchangeable sleeve 10 is screwed fully, that is to say over its entire thread engagement length L1, to the thread end portion 3A of the threaded bolts, and the tensioning process can begin.

This tensioning process is reproduced in FIG. 3. Under the hydraulic pressure in the working chamber 18 the piston 15 is raised, carrying the interchangeable sleeve supported on the carrier face 21 with it. The threaded bolt 3 is stressed and tightened and a gap is formed between the underside of the net 4 and the base 8. The nut 4 can then be retightened by effortless turning, preferably through the openings 9.

Second markings 47, 48, which are situated below or above the markings 37, 38 already described, serve for monitoring the tensioning process. When the annular marking 47 on the interchangeable sleeve is situated at the same levels as the sighting window 48 in the socket 40 serving as countermark, it is apparent from this correlation—and the machine operator is advised accordingly—that the maximal admissible tensioning travel has been reached.

The specification incorporates by reference the entire disclosure of German priority document 10 2015 104 133.2 having a filing date of Mar. 19, 2015.

While specific embodiments of the invention have been shown and described in detail to illustrate the inventive principles, it will be understood that the invention may be embodied otherwise without departing from such principles.

LIST OF REFERENCE NUMERALS 1 cylindrical housing
2 support tube
3 threaded bolt
3A thread end portion
4 nut
7 hydraulic connection
8 base
9 opening
10 interchangeable sleeve
11 internal thread
15 piston
17 spring
18 hydraulic working chamber
21 carrier face, first longitudinal stop
22 second longitudinal stop
24 main body
25 radially expanded portion
26 end piece
28 polyhedron, flat face
30 spring
35 collar
37 marking
38 marking
40 socket
42 wall
43 end face
47 marking
48 marking
F pre-tensioning force
L1 thread engagement length
L2 longitudinal travel

What is claimed is:

1. A tensioning device for extending a thread end portion of a threaded bolt, the tensioning device comprising:
    a cylindrical housing configured to be supported against a fixed abutting base;
    at least one piston disposed in the cylindrical housing and comprising a carrier face, wherein the at least one piston is moveable in a longitudinal direction of the at least one piston within the cylindrical housing and is configured to be connected to a hydraulic supply;
    an interchangeable sleeve extending centrally through the at least one piston and comprising a first end having an internal thread with an engagement length, the internal thread configured to be screwed onto the thread end portion of the threaded bolt;
    the interchangeable sleeve comprising a radially expanded portion configured to be supported axially by the carrier face of the at least one piston;
    the interchangeable sleeve moveable longitudinally in relation to the at least one piston, wherein a longitudinal travel of the interchangeable sleeve is delimited by the carrier face forming a first longitudinal stop and by a second longitudinal stop opposite the first longitudinal stop;

wherein a length of the longitudinal travel is at least equal to the engagement length of the internal thread of the interchangeable sleeve.

2. The tensioning device according to claim 1, wherein the length of the longitudinal travel is greater than the engagement length of the internal thread of the interchangeable sleeve.

3. The tensioning device according to claim 1, further comprising a first spring acting on the interchangeable sleeve such that the interchangeable sleeve is forced by the first spring against the second longitudinal stop.

4. The tensioning device according to claim 3, further comprising a second spring supported with a first end against the cylindrical housing and supported with a second end against the at least one piston, wherein the first spring is weaker than the second spring.

5. The tensioning device according to claim 4, wherein the at least one piston comprises a wall enclosing a cavity, wherein the radially expanded portion of the interchangeable sleeve is arranged in the cavity, wherein the cavity has a length such that the radially expanded portion is moveable in the cavity across the longitudinal travel, wherein the wall of the at least one piston has an upper end face, wherein the second end of the second spring is supported against the end face of the wall.

6. The tensioning device according to claim 5, wherein the wall comprises a cylindrical outside surface and the cylindrical housing comprises an inside wall, wherein the cylindrical outside surface of the wall and the inside wall of the cylindrical housing together form a longitudinal guide of the at least one piston.

7. The tensioning device according to claim 3, wherein the first spring is a coil spring enclosing a longitudinal portion of the interchangeable sleeve and comprising a first end supported against the interchangeable sleeve.

8. The tensioning device according to claim 7, wherein the first spring comprises a second end supported against a face of the cylindrical housing.

9. The tensioning device according to claim 8, wherein the interchangeable sleeve comprises a collar provided at an end of the interchangeable sleeve remote from the internal thread, wherein the first end of the first spring is supported against the collar.

10. The tensioning device according to claim 9, wherein the interchangeable sleeve comprises an end piece and the collar is formed on the end piece.

11. The tensioning device according to claim 10, wherein the end piece is screw-connected to a main body of the interchangeable sleeve.

12. The tensioning device according to claim 1, further comprising a socket fixed to the cylindrical housing and enclosing an end portion of the interchangeable sleeve, wherein the end portion is remote from the internal thread, wherein the end portion comprises a first marking and the socket comprises a second marking, wherein the first and second markings are to be aligned with each other.

13. The tensioning device according to claim 12, wherein the first marking is a visual marking and the second marking on the socket is a sighting window.

14. The tensioning device according to claim 13, wherein the first marking is a color marking or a contrast marking.

15. The tensioning device according to claim 13, wherein the visual marking is externally visible in the sighting window only when the radially expanded portion of the interchangeable sleeve bears on the carrier face.

* * * * *